United States Patent [19]

Nobuta

[11] 3,992,296

[45] Nov. 16, 1976

[54] DEVICE FOR DETECTING THE CLOGGING OF STRAINER FILTER

[75] Inventor: Kouji Nobuta, Yokohama, Japan

[73] Assignee: Nihon Rokaki, Kabushiki Kaisha, Tokyo, Japan

[22] Filed: June 25, 1975

[21] Appl. No.: 590,266

Related U.S. Application Data

[63] Continuation of Ser. No. 458,997, April 8, 1974, abandoned.

[52] U.S. Cl. .............................. 210/90; 116/117 R; 137/557; 210/94
[51] Int. Cl.² .......................................... B01D 35/14
[58] Field of Search ................ 116/117 R, DIG. 25, 116/DIG. 42, 70; 137/557; 210/90, 91, 94

[56] References Cited
UNITED STATES PATENTS

| | | |
|---|---|---|
| 2,638,581 | 5/1953 | Marvel ............................ 116/117 R |
| 2,661,847 | 12/1953 | Buettner ........................... 210/90 X |
| 3,011,470 | 12/1961 | Stoermer .......................... 210/90 X |
| 3,780,693 | 12/1973 | Parr ...................................... 116/70 |

Primary Examiner—Charles N. Hart
Assistant Examiner—R. G. Mukai
Attorney, Agent, or Firm—Price, Heneveld, Huizenga & Cooper

[57] ABSTRACT

A hemispherical, transparent cover is provided in which a bellows having substantially the same hemispherical configuration is provided. A liquid having a different color than that of the bellows is filled between said transparent cover and the bellows whereby a difference in color may be perceptible from the outside of the transparent cover, depending on the pressure differential between the inlet side and outlet side of a strainer caused by clogging of its filter.

8 Claims, 4 Drawing Figures

DEVICE FOR DETECTING THE CLOGGING OF STRAINER FILTER

CROSS-REFERENCE TO RELATED APPLICATION

This is a continuation of application Ser. No. 458,997, filed Apr. 8, 1974 now abandoned.

This invention relates to a device for detecting the clogging of the filter element of a strainer. More particularly, this device is contemplated to detect clogging of the filter element from the outside of the strainer, such as a fuel strainer for an internal combustion engine, a lubrication oil strainer or the strainer for hydraulic apparatus.

The device is such that when clogging of the filter element occurs, a pressure differential of the liquid between the inlet side and outlet side of the filter element can be detected by providing an indication that is easily perceived from the outside of the strainer.

Generally the filter element is housed inside the strainer. Therefore, to determine whether it is clogged or blocked, it is necessary to disassemble the strainer to check the interior of it. This work is very troublesome.

One object of the present invention is to make it possible to observe the clogging of the filter element from the outside of the strainer, without disassembling it.

Other object of the present invention is to provide a clog detecting device in which color, indicating clogging of the filter, is differentiated from color indicating normal operation.

The device of the present invention is such that it enables the operator to detect the clogging of the filter by the resulting pressure differential between the inlet and outlet of the strainer. The device consists of a transparent cover of hemispherical shape, a bellows of which the top portion is hemispherical to be close to the inside face of the hemispherical portion of the transparent cover, a means responsive to a pressure differential between the inlet and outlet of the strainer, a liquid between the transparent cover and bellows, said liquid having a color different from that of the bellows and a standard mounting the transparent cover and bellows.

The present invention will become more apparent from the following description with reference to the accompanying drawings in which.

In the above drawings, each left-half of the view shows the device as it is when the filter is clogged and the right-half shows the device as it is when the filter is not clogged.

Figure 1:
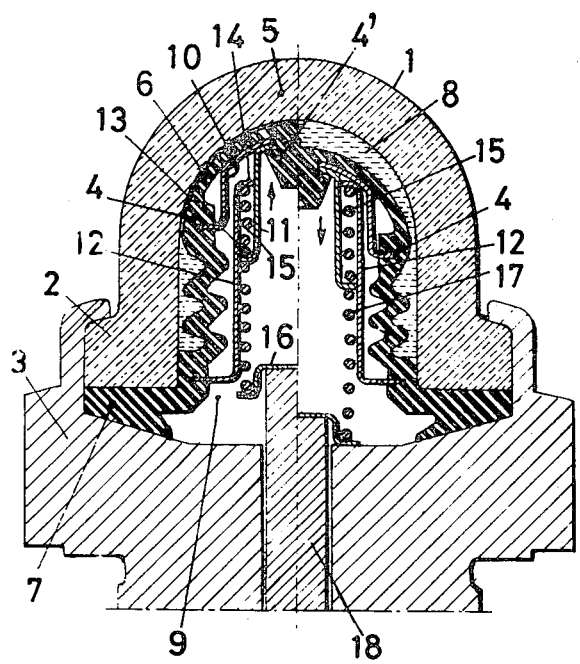
FIG. 1 is a longitudinal section view of a first embodiment of the present invention.

Referring now to FIG. 1 which illustrates the indicating portion of the device, numeral 1 designates a transparent cover, its shape being substantially hemispherical and its circumferential flanged portion 2 is inserted in a standard 3. Within the cover 1 is a bellows or diaphragm 4, the open end or upper face portion 6 of which is hemispherical and which, under normal operating circumstances, is in close contact with the inner face of a hemispherical portion 5 of the transparent cover 1. The other end of the bellows has an annular flange 7 forming a central opening or inner chamber 9 therethrough. This flange together with the flange 2 of transparent cover 1 is inserted in the rim of standard 3.

The space between the transparent cover 1 and bellows 4 forms an outer chamber and is filled with a liquid 8 of which color is different from that of the bellows.

As shown in the left-half of FIG. 1, when the transparent cover 1 and the hemispherical open end or face portion 6 of the bellows are in close contact, the color of the bellows can be seen from the outside of the transparent cover 1. Also as shown in the right-half of FIG. 1, when the liquid 8 fills outer chamber the space between the hemispherical portion 5 of the cover 1 and bellows 4, the color of the liquid can be seen from outside the transparent cover 1.

In the case of FIG. 1, assuming the bellows 4 is colored red and the liquid 8 is colored green, when filter becomes clogged, the red color of the bellows will appear and when the filter is operating normally the green color of the liquid will appear.

A projection 4' is provided centrally of the inside face or closed end of the hemispherical portion 6 of bellows 4. A metal reinforcement is provided to maintain the hemispherical shape of the portion 6 of the bellows. It surrounds the projection 4' and fits closely about the base of the projection. A movable rod 11 is provided having one end attached to the projection 4'. A guide member 12 surrounds and telescopically engages the other end of said movable rod 11. The other end of the guide member is attached to the bellows 4 adjacent the inner chamber opening 9. Between an outwardly flanged portion 13 at the lower end of said movable rod 11 and an inward flanged portion 14 at the top end of said guide member 12 a spring 15 is mounted. The spring 15 surrounds the upper portion of the guide member 12. A second spring 17 surrounds the guide member 12 between the outwardly flanged portion 13 of rod 11 and the lower end of the spring 17 rests on the spring seat 16. This spring seat 16 is mounted on the top of rod 18 which is vertically movable in response to changes in the pressure differential between the inlet side and outlet side of the strainer reflecting the condition of the filter. Movable rod 11, guide 12, springs 15 and 17, spring seat 16 and rod 18 cooperatively form plunger means which operate to shift the bellows or diaphragm between expanded and contracted positions. The lowermost end of rod 18 forming a part of the plunger means is adapted by means, which will be more fully described in connection with FIGS. 2–4, to sense the pressure differential indicative of the condition of the filter. The device is mounted with respect to the strainer of a filter (not shown) such that the lower end of rod 18 is exposed to fluid pressure and rod 18 will respond to changes in the pressure differential.

When the filter of the strainer is clear, i.e., not clogged, the rod 18 assumes the position shown in the right-hand half of FIG. 1 and the bellows 4 is in a lowered or retracted position. In this instance, a space exists between the hemispherical portion 5 of the cover 1 and the top hemispherical portion 6 of bellows 4 which is filled with liquid. Should this liquid be colored green, the green of the liquid will be seen through the transparent cover 1 indicating that the filter is not clogged.

When the filter becomes clogged, the pressure changes and the rod 18 will shift upwardly to the position shown on the left-hand side of FIG. 1 in which the bellows 4 is extended upwardly displacing the colored liquid 8 from the outer chamber between the hemispherical portion 5 of the transparent cover 1 and the corresponding hemispherical portion 6 of the bellows 4. The displaced liquid is forced into the space forming a liquid reservoir between the lower portion of the transparent cover 1 and the lower portion of the bellows 4. Thus, the hemispherical portion 5 of the transparent cover 1 and the hemispherical top portion of the bellows 4 come into close contact. In this instance, the color which will be observed from the outside of the transparent cover 1 is that of the bellows 4. If the bellows is red, the color will have changed from green to red. This indicates that the filter is clogged.

The springs 15 and 17 are provided to dampen the vertical movement of the rod 18. Also the movable rod 11 and guide member 12 guide the vertical movement of the bellows 4.

It will be noted that the side walls of the bellows 4, between its hemispherical top 6 and its base flange 7, is formed intoa series of ridges or corrugations which serve the dual purpose of allowing the top portion to move vertically and of providing an expandable chamber or liquid reservoir for storing the displaced liquid as the bellows moves upwardly under pressure from the rod 18.

Figure 2:
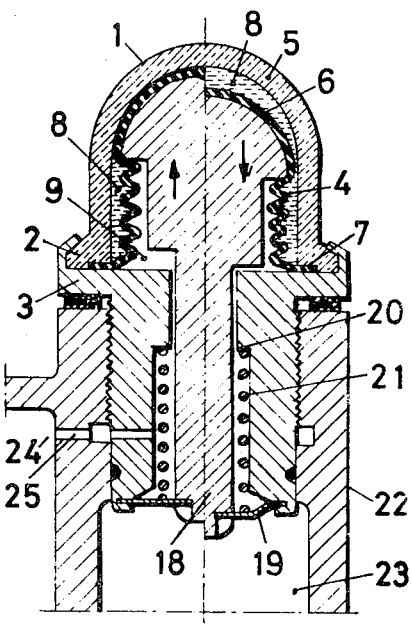
FIG. 2 is a similar view of a second embodiment.

In FIG. 2 illustrating a modified form of the invention, numerals 1–9 and 18 designate the same parts in FIG. 1. In addition, portions of the strainer associated with a filter are illustrated. The top end of the rod 18 is directly coupled with the hemispherical portion 6 of the bellows 4 and its lower end is coupled with a diaphragm 19. Between the step portion 20 formed in a part of the standard 3 and the diaphragm 19, a spring 21 is interposed which spring normally maintains the bellows 4 in the position shown in the right-hand half of FIG. 2.

The lower face of the diaphragm 19 is exposed to the inlet side 23 of the strainer 22 and the upper face of the diaphragm 19 communicates with the outlet side 24 of the strainer 22 through an orifice 25.

When the filter becomes clogged, pressure in the outlet side 23 decreases whereby a greater pressure differential is produced between the lower side of the diaphragm 19 and upper side of the diaphragm 19. As a result of the increase in the pressure differential the diaphragm 19 is pushed upward from the position shown in the right-hand half of FIG. 2 to the position shown in the left-hand half of FIG. 2. With this movement, the rod 18, as well as the bellows 4, rises upwardly giving the same indication as in the case of the device illustrated in FIG. 1.

Figure 3:
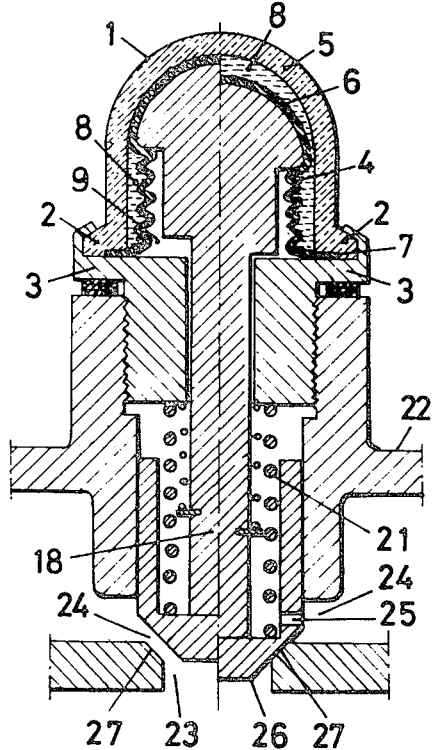
FIG. 3 is a similar view of a third embodiment.

In FIG. 3, numerals 1–9, 18 and 21–25 designate the corresponding parts shown in FIG. 2. 26 is a piston shaped valve. 27 is a valve seat. With these, the portion 23 communicates with the inlet side of the filter and portion 24 communicates with the outlet side of the filter. Both of these are defined by the strainer housing 22. When the filter is clogged the pressure in the inlet side 23 becomes greater than that on the outlet side 24. When this differential in pressure becomes greater than the resistance of the spring 21, the piston shaped valve 26 is pushed upwardly against the force of spring 21. The upward movement of the piston forces the bellows from the position shown in the right-hand half of FIG. 3 to the position shown in the left-hand half of this view. In this instance, as the bellows 4 rises upwardly, its color becomes visible from the outside of the cover 1, as in the case in FIG. 2.

Figure 4:
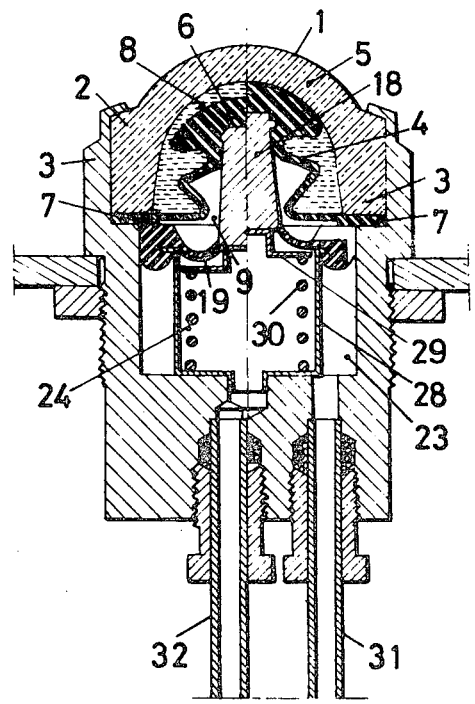
FIG. 4 is a similar view of a fourth embodiment.

In FIG. 4 numerals 1–9, 18, 19 and 23–25 designate the functionally corresponding parts shown in FIG. 2. 28 is a metal cylinder seating a diaphragm 19. 29 is a spring seat attached to the lower end of the vertically reciprocal rod 18. 30 is a spring mounted within the cylinder 28 having one end seated against the bottom of the cylinder and the other against the spring seat 29. A pipe 31 connects to the inlet side of strainer (not shown). The pipe 32 connects to the outlet side of the strainer.

In this embodiment, when the filter becomes clogged and the pressure in the inlet side 23 of the strainer (pipe 31) becomes greater than that in the outlet side 24 (pipe 32) and the diaphragm 19 is pushed downwardly against the force of spring 30. This results in the bellows being displaced from the position shown in the right-hand half of FIG. 4 to the position shown in the left-hand half of the view.

In this instance, colored liquid 8 between the lower portions of the bellows 4 and the transparent cover 1 is moved into the space between the top portion 5 of transparent cover 1 and the hemispherical portion 6 of bellows 4 whereby color of the liquid color becomes visible from the outside of transparent cover 1.

This indicates that the filter has clogged.

When the clogged filter is replaced with a new filter, the pressure in the outlet side 23 rises until the pressure on the upper side of the diaphragm 19 comes to approximate to that in the lower side of the diaphragm resulting in the bellows 4 rising upwardly with the force of spring 30 from the position in the left-hand half of FIG. 4 to that shown in the right-hand half of this view and the color of the bellows becomes visible. In this case of FIG. 4, if the hemispherical portion 6 of the bellows 4 is colored green and liquid is colored red, red indicates the clogging of the filter and green indicates that the filter is clean.

The embodiments of the invention in which an exclusive property or privilege is claimed are defined as follows:

1. A device for indicating as an expression of pressure differential the fluid passing ability of a filter having an inlet, an outlet and a fluid passageway therebetween, said device comprising: a housing adapted for connection to the filter; said housing having a chamber; a dome-shaped transparent member protruding from and closing one end of said chamber; a flexible tubular diaphragm element seated in said chamber and dividing said chamber into an inner chamber portion and an outer chamber portion, said outer chamber portion being adjacent said transparent member; said diaphragm element sealing said inner chamber and said outer chamber portions from each other, whereby said outer chamber portion is isolated from said inner chamber portion; said flexible diaphragm element having sides, a closed end in said inner chamber portion and an open end in said outer chamber portion; said flexible diaphragm element being expandable and contractible, whereby said open end of said diaphragm element can be expanded and contracted to substantially occupy and substantially vacate said outer chamber portion; plunger means mounted in said housing for reciprocal movement between extended and retracted positions and having one end seated against said closed end of said diaphragm in said inner chamber portion, the other end of said plunger means being adapted to respond to a fluid pressure differential between said inlet and said outlet; a spring urging said plunger means toward its retracted position whereby said plunger means is extended in response to a change in fluid pressure differential between said inlet and said outlet; said open end of said diaphragm element when said plunger means is extended occupying the portion of said outer chamber portion adjacent to and seating snugly against the entire curved surface of said transparent member and when said plunger means is retracted being spaced from said curved surface; a colored liquid in said outer chamber portion; said sides of said diaphragm element flexing inwardly into said inner chamber portion as said plunger extends to create a liquid reservoir of said colored liquid displaced from against said curved surface in said outer chamber portion, said diaphragm element and said colored liquid being of contrasting colors whereby said transparent member exhibits one color throughout its curved surface when said open end of said diaphragm element is expanded to occupy that portion of said outer chamber portion adjacent said curved surface and said liquid is confined to said reservoir and a different color when said diaphragm element is contracted and said outer chamber portion between said open end and the curved portion of said transparent member is occupied by said colored liquid.

2. A device as described in claim 1 wherein said other end of said plunger is exposed to the fluid pressure at said inlet, means providing the fluid pressure at the outlet acting on said plunger cooperatively with said spring; and with said spring urging said plunger means into normally retracted position whereby when said filter becomes clogged the fluid pressure drop at said outlet is such that the fluid pressure acting on said plunger means from said inlet urges said plunger means into extended position against the resistance of said spring.

3. The device as recited in claim 1 wherein said plunger means has a head portion sealed in said inner chamber portion and said head portion has a shape corresponding to the shape of the inner face of said transparent member.

4. The device as recited in claim 1 wherein said sides of said diaphragm element are of corrugated shape to form an accordian-like bellows, the expansion and contraction of which varies the volumetric capacity of the reservoir.

5. A device for indicating as an expression of pressure differential the fluid passing ability of a filter having an inlet, an outlet and a fluid passageway therebetween, said device comprising: a housing adapted for connection to the filter; said housing having a chamber; a dome-shaped transparent member protruding from and closing one end of said chamber, a flexible tubular diaphragm element seated in said chamber and dividing said chamber into an inner chamber portion and an outer chamber portion, said outer chamber portion being adjacent said transparent member; said diaphragm element sealing said inner chamber and said outer chamber portions from each other, whereby said outer chamber portion is isolated from said inner chamber portion; said flexible diaphragm element having sides, a closed end in said inner chamber portion and an open end in said outer chamber portion; said flexible diaphragm element being expandable and contractible, whereby said open end of said diaphragm element can be expanded and contracted to substantially occupy and substantially vacate said outer chamber portion; plunger means mounted in said housing for reciprocal movement between extended and retracted positions and having one end seated against said closed end of said diaphragm in said inner chamber portion, the other end of said plunger means being adapted to respond to a fluid pressure differential between said inlet and said outlet; a spring urging said plunger means toward its extended position whereby said plunger means is retracted in response to a change in fluid pressure differential between said inlet and said outlet; said open end of said diaphragm element when said plunger means is extended occupying the portion of said outer chamber portion adjacent to and seating snugly against the entire curved surface of said transparent member and when said plunger means is retracted being spaced from said curved surface; a colored liquid in said outer chamber portion; said sides of said diaphragm element flexing inwardly into said inner chamber portion as said plunger extends to create a liquid reservoir of said colored liquid displaced from against said curved surface in said outer chamber portion, said diaphragm element and said colored liquid being of contrasting colors whereby said transparent member exhibits one color throughout its curved surface when said open end of said diaphragm element is expanded to occupy that portion of said outer chamber portion adjacent said curved surface and said liquid is confined to said reservoir and a different color when said diaphragm element is contracted and said outer chamber portion between said open end and the curved portion of said transparent member is occupied by said colored liquid.

6. A device as described in claim 5 wherein said other end of said plunger is exposed to the fluid pressure at said inlet, means providing the fluid pressure at the outlet acting on said plunger cooperatively with said spring; and with said spring urging said plunger into normally extended position to displace said colored liquid whereby when said filter becomes clogged the pressure increase at said inlet is such that the fluid pressure acting on said plunger means urges said plunger means into retracted position against the resistance of said spring.

7. The device as recited in claim 5 wherein said plunger means has a head portion sealed in said inner chamber portion and said head portion has a shape corresponding to the shape of the inner face of said transparent member.

8. The device as recited in claim 5 wherein said sides of said diaphragm element are of corrugated shape to form an accordian-like bellows, the expansion and contraction of which varies the volumetric capacity of the reservoir.

* * * * *